(12) United States Patent
Teague et al.

(10) Patent No.: US 12,313,809 B2
(45) Date of Patent: May 27, 2025

(54) NON-INVADED FORMATION DENSITY MEASUREMENT AND PHOTOELECTRIC EVALUATION USING AN X-RAY SOURCE

(71) Applicants: Philip Teague, Houston, TX (US); Robert Sloan, Park City, UT (US)

(72) Inventors: Philip Teague, Houston, TX (US); Robert Sloan, Park City, UT (US)

(73) Assignee: Visuray Intech Ltd (BVI), Road Town (VG)

(*) Notice: Subject to any disclaimer, the term of this patent is extended or adjusted under 35 U.S.C. 154(b) by 0 days.

(21) Appl. No.: 17/889,993

(22) Filed: Aug. 17, 2022

(65) Prior Publication Data
US 2023/0003916 A1   Jan. 5, 2023

Related U.S. Application Data

(63) Continuation of application No. 15/900,967, filed on Feb. 21, 2018, now abandoned.

(60) Provisional application No. 62/614,810, filed on Jan. 8, 2018.

(51) Int. Cl.
G01V 5/12 (2006.01)
G01V 5/04 (2006.01)
G01V 5/08 (2006.01)

(52) U.S. Cl.
CPC ............... *G01V 5/12* (2013.01); *G01V 5/045* (2013.01); *G01V 5/08* (2013.01)

(58) Field of Classification Search
CPC ............. G01V 5/12; G01V 5/045; G01V 5/08
See application file for complete search history.

(56) References Cited

U.S. PATENT DOCUMENTS 7,564,948 B2 * 7/2009 Wraight .................. H01J 35/06
378/111

FOREIGN PATENT DOCUMENTS

EP          0860715 A1 *  8/1998

* cited by examiner

*Primary Examiner* — Kiho Kim
(74) *Attorney, Agent, or Firm* — Adams & Reese LLP; John Henry Scott, III (57) ABSTRACT

An x-ray based litho-density tool for measurement of simultaneous invaded and non-invaded formation surrounding a borehole is provided, the tool including at least an internal length comprising a sonde section, wherein sonde section further includes an x-ray source; at least one radiation measuring detector; at least one source monitoring detector; and a plurality of sonde-dependent electronics. In various embodiments, the tool uses x-rays to illuminate the formation surrounding a borehole, and a plurality of detectors are used to directly measure both invaded and non-invaded formation bulk densities. Detectors used to measure borehole standoff such that other detector responses may be compensated for tool standoff; long and ultra-long space detectors disposed in electromagnetic communication with a source located within a collimated tungsten radiation shield; and wear-pads disposed such that the source and detector assembly may be pressed against the side of the borehole to reduce borehole effects are also provided.

15 Claims, 5 Drawing Sheets

NON-INVADED FORMATION DENSITY MEASUREMENT AND PHOTOELECTRIC EVALUATION USING AN X-RAY SOURCE

CROSS-REFERENCES TO RELATED APPLICATIONS

This patent application claims benefit of U.S. patent application Ser. No. 15/900,967, filed Feb. 21, 2018 which claims benefit of U.S. Provisional Patent Application No. 62/614,810, filed Jan. 8, 2018, which claims benefit of U.S. Provisional Patent Application No. 62/464,426, filed Feb. 28, 2017, which claims the benefit of PCT/US18/18915 filed Feb. 21, 2018, which is Published claims the benefit of U.S. patent application Ser. No. 15/900,967 filed Feb. 28, 2017, the contents of which are hereby incorporated by reference in their entirety.

FIELD OF THE INVENTION

The present invention relates generally to methods and means for formation density and photoelectric evaluation, and in a particular though non-limiting embodiment to methods and means of non-invaded formation density measurement and photoelectric evaluation using an x-ray source.

BACKGROUND

Well or borehole logging is the practice of making an accurate record, known as a well log, of the geologic formations through which a borehole creates a path or conduit. Well logging activities are performed during all phases of an oil and gas well's development; drilling and evaluation, completion, production and abandonment.

The oil and gas industry logs rock and fluid properties to find hydrocarbon-bearing strata in the formations intersected by a borehole. The logging procedure consists of lowering a tool on the end of a wireline into the well to measure the properties of the formation. An interpretation of these measurements is then made to locate and quantify potential zones containing hydrocarbons and at which depths these zones exist.

Logging is usually performed as the logging tools are pulled out of the hole. This data is recorded in real-time via a data connection to the surface logging unit or using a memory unit aboard the tool to create either a printed record or electronic presentation called a well log which is then provided to the client. Well logging is performed at various intervals during the drilling of the well and when the total depth is drilled.

Density logging is the practice of using a specific well logging tool to determine the bulk density of the formation along the length of a wellbore. The bulk density is the overall density of a rock including the density of the minerals forming the rock and the fluid enclosed in the pores within the rock.

A radioactive isotope-based source, usually Cesium 137 ($^{137}Cs$), applied to the wall of the borehole emits gamma rays into the formation so these gamma rays may be thought of as high velocity particles which collide with the electrons of the atoms that compose the formation. At each collision the gamma rays lose energy to the electrons, and then continue with diminished energy. This type of interaction is known as Compton scattering. A proportion of the scattered gamma rays reach detectors, located at fixed distances from the source, and is counted as an indication of formation density.

The number of Compton scattering collisions is related directly to the number of the electrons per unit volume, or electron density, within the formation. Consequently, the electron density determines the response of the density tool.

Wellbore logging operations within the oil and gas industry currently use radioactive isotopes for the purpose of a ready supply of gamma rays which are used in the evaluation of the geological formations surrounding a borehole.

The use of radioactive isotopes within oilfield operations such as the production, logistics, handling, operational use and disposal of such sources is controlled by regulation. The transport of such isotopes across geographical and political borders is heavily regulated and controlled, due to the risk associated with the potential to cause harm to humans, either accidentally or intentionally, through the direct dispersal of the radioactive materials across a populated region or indirectly via introduction into the food chain.

However, the use of such isotopes is tolerated as there has been no viable replacement for the technology until recently. The ability to replace radioactive isotopes with devices and methods which do not utilize radioactive materials boasts a number of key advantages when considering all aspects of the operational cycle of a wellbore log, from commercial to health, safety and the environment.

The use of $^{137}Cs$ within oilfield operations is controlled through governmental regulation, export treaties and embargoes. Generally, such isotopes are produced in a nuclear reactor in the country in which they are intended to be used. The transport of such isotopes across geographical and political borders is heavily regulated and controlled, due to the risk associated with the potential to cause harm to humans, either accidentally or intentionally, through the direct dispersal of the radioactive materials across a populated region or indirectly via introduction into the food chain.

After entering the body, $^{137}Cs$ is generally uniformly distributed throughout the body, with higher concentrations manifesting in muscle tissues and lower concentrations in bones. The biological half-life of $^{137}Cs$ is about 70 days. Experiments on canines showed that a single dose of 0.0038 Curie per kilogram is lethal within three weeks. Density logging operations in oilfield typically use 1.1 Curie of $^{137}Cs$ which equates of a small volume of material weighing 0.012 grams.

The improper handling of $^{137}Cs$ gamma ray sources can lead to release of the radioisotope and consequent radiation injuries. Cesium gamma ray sources that have been encased in metallic housings can be mixed in with scrap metal on its way to smelters, resulting in production of steel contaminated with radioactivity.

In oilfield operations, isotopes can be lost into the well as a result of the breakage of the logging tool at the risk of being irretrievable. Such events can lead to the closure of the well or measures taken to ensure that radioactive material cannot circulate or permeate out of the well, Indeed, direct contamination and the risk to oilfield workers of dangerous levels of exposure are not uncommon. Although comprehensive control measures are in place, the risk associated with the use of highly radioactive isotopes during oilfield operations will always be present—unless a viable isotope-free option can be introduced.

As is the nature of radioactive materials, the half-life of the material also determines its useful lifetime. Although density logging tools are calibrated to take into account the reduction in activity of an isotope, the useful life of the isotope is somewhat short-lived. A $^{137}Cs$ source will be producing only half of its initial gamma ray output after a period of 30 years. A consequence is that isotope-based sources need to be replaced at intervals, and the older isotopes disposed of. The disposal requirements must take similar precautions to that of normal nuclear waste, such as that produced as a waste product at nuclear power stations.

However, none of the prior art teaches of the ability to increase the axial offset of the density detectors for the purpose of avoiding the mud-invaded zone, thereby increasing the accuracy of the litho-density measurement and lessening the impact of mud-weight and formation porosity on the litho-density measurement.

For example, U.S. Pat. No. 7,675,029 to Teague et al. teaches the use of an, x-ray device to create a two-dimensional image of a target object in a borehole using backscattered radiation from an x-ray source by means of a collimated detector, but fails to disclose a method of using the increased output of the x-ray device to enable longer offset detectors to enable analysis of the non-invaded zone of the formation. Methods to increase the permissible count rate within a detector volume by doubling the number of PMTs for a given detector volume and the use of an x-ray source to measure the photoelectric properties of a formation directly are also not disclosed.

U.S. Pat. No. 7,564,948 Wraight et al. discloses an x-ray source being used as a replacement for a chemical source during density logging along with various means of arranging the apparatus and associated power supply, and also discloses a means of filtering the primary beam from the x-ray source such that a filtered dual-peak spectrum can be detected by a reference detector used to directly control (feedback) the x-ray tube voltage and current for stability purposes. However, the reference only teaches a compact x-ray device (bipolar) with a grid, a power supply which is a Cockcroft-Walton rolled up into a cylinder (between two Teflon cylinders) to save space, and the aforementioned filtered reference detector method. Methods and means of using the increased output of the x-ray device to enable longer offset detectors to enable analysis of the non-invaded zone of the formation, increasing the permissible count rate within a detector volume by doubling the number of PMTs for a given detector volume, and the use of an x-ray source to measure the photoelectric properties of a formation directly are also not disclosed.

U.S. Pat. No. 8,481,919 to Teague teaches a means of creating and controlling the electrical power necessary, by serially stepping up the DC reference and creating high potential field control surfaces, to control either a bipolar or unipolar x-ray tube for the purposes of replacing chemical sources in reservoir logging. The reference also teaches moveable/manipulable beam hardening filters and rotating light-house collimation on the source, and the use of gaseous insulators including $SF_6$ as an electrical insulator in a downhole x-ray generator. However, the reference fails to disclose a method of using the increased output of the x-ray device to enable longer offset detectors to enable analysis of the non-invaded zone of the formation. The reference also fails to disclose a method of increasing the permissible count rate within a detector volume by doubling the number of PMTS for a given detector volume as well as the use of an x-ray source to measure the photoelectric properties of a formation directly.

SUMMARY

An x-ray based litho-density tool for measurement of simultaneous invaded and non-invaded formation surrounding a borehole is provided, the tool including at least an internal length comprising a sonde section, wherein said sonde section further comprises an x-ray source; at least one radiation measuring detector; at least one source monitoring detector; and a plurality of sonde-dependent electronics. According to some aspects of the invention, the tool uses x-rays to illuminate, the formation surrounding a borehole, and a plurality of detectors are used to directly measure both invaded and non-invaded formation bulk densities. Detectors used to measure borehole standoff such that other detector responses may be compensated for tool standoff; long and ultra-long space detectors disposed in electromagnetic communication with a source located within a collimated tungsten radiation shield; and wear-pads disposed such that the source and detector assembly may be pressed against the side of the borehole to reduce borehole effects are also provided.

BRIEF DESCRIPTION OF SEVERAL EXAMPLE EMBODIMENTS

The invention described herein consists of a method and apparatus to use an electronic x-ray device as a replacement for a chemical gamma ray source when attempting to achieve a density computation to determine the density of a formation within an oil and gas well. The invention further teaches of a means of improving upon the accuracy of the measurement by using the significantly higher output of an x-ray source (compared to 1.5 Ci of $^{137}$Cs) to increase the axial offset of a bulk-density detector, while maintaining the statistical requirements necessary to achieve 0.01 g/cc repeatability, thereby permitting a depth of investigation that is outside of the mud-invaded zone of the formation within the oil and gas well. This method provides a way to add data to the litho-density measurement and provides a method to remove uncertainty regarding mud-weight dependencies.

The method consists of known and new technologies combined in a new application with respect to radiation physics and formation evaluation measurements for use within the oil and gas industry. The method is further embodied by a means, which may be used to practice the method for use in a water, oil or gas well.

The typical regulatory limit for the amount of $^{137}$Cs which may be used during a logging operation is a maximum of 1.3 Curie. During density logging operations, a certain number of photons per second are required to enter into the detectors to ensure a high enough statistic for the purposes of data quality consistency and interpretation. As a result, density logging operations are normally performed such that the tool is moved at a rate of 1,800 ft/hr to ensure sufficient photons enter the detectors at any particular depth to offer a data resolution acceptable to the client (typically a repeatability to 0.01 g/cc density). In a 15,000 ft long well, this can translate to just over 8 hours of logging time, bottom to surface (or at least 2 hours in the zone of the reservoir).

The operations cannot currently be performed faster as the speed of logging relates to the acquisition speed that is proportional to the output of the gamma source. For safety reasons, the amount of $^{137}$Cs which may be used is capped, with a resultant cap in the minimum amount of time required to perform a log.

There are currently no viable technologies that have the ability to increase the axial offset of the density detectors for the purpose of avoiding measurement of the mud-invaded zone, thereby increasing the accuracy of the litho-density measurement and lessening the impact of mud-weight and formation porosity on the litho-density measurement.

Figure 1:
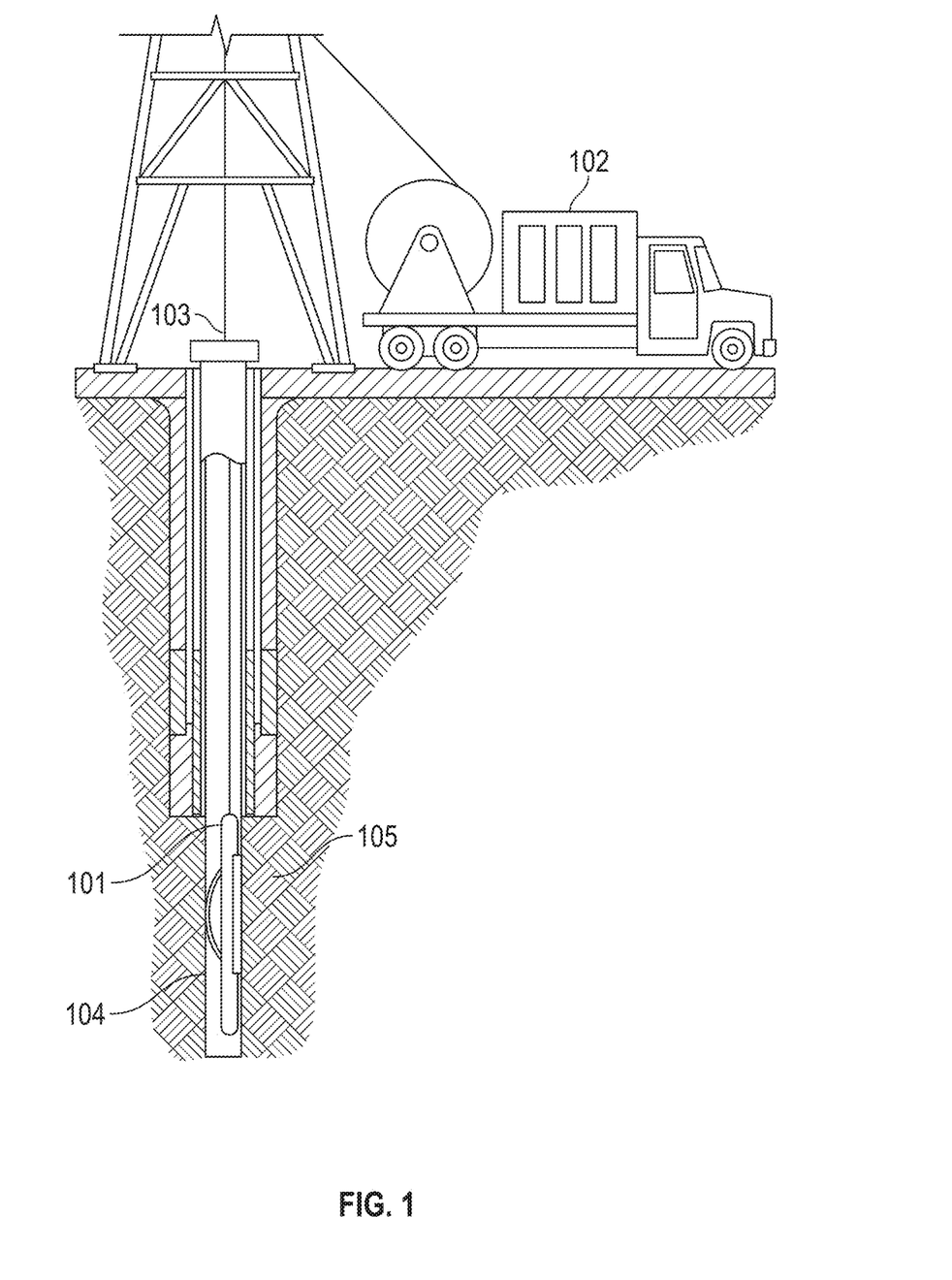
FIG. 1 illustrates an x-ray based litho-density formation evaluation tool deployed by a wireline conveyance into a borehole, wherein the formation density is measured by the tool.

With reference now to the attached Figures, FIG. 1 illustrates an x-ray based litho-density formation evaluation tool [101] is deployed by wireline conveyance [102, 103] into a borehole [104], wherein the formation [105] density is measured by the tool [101].

Figure 2:
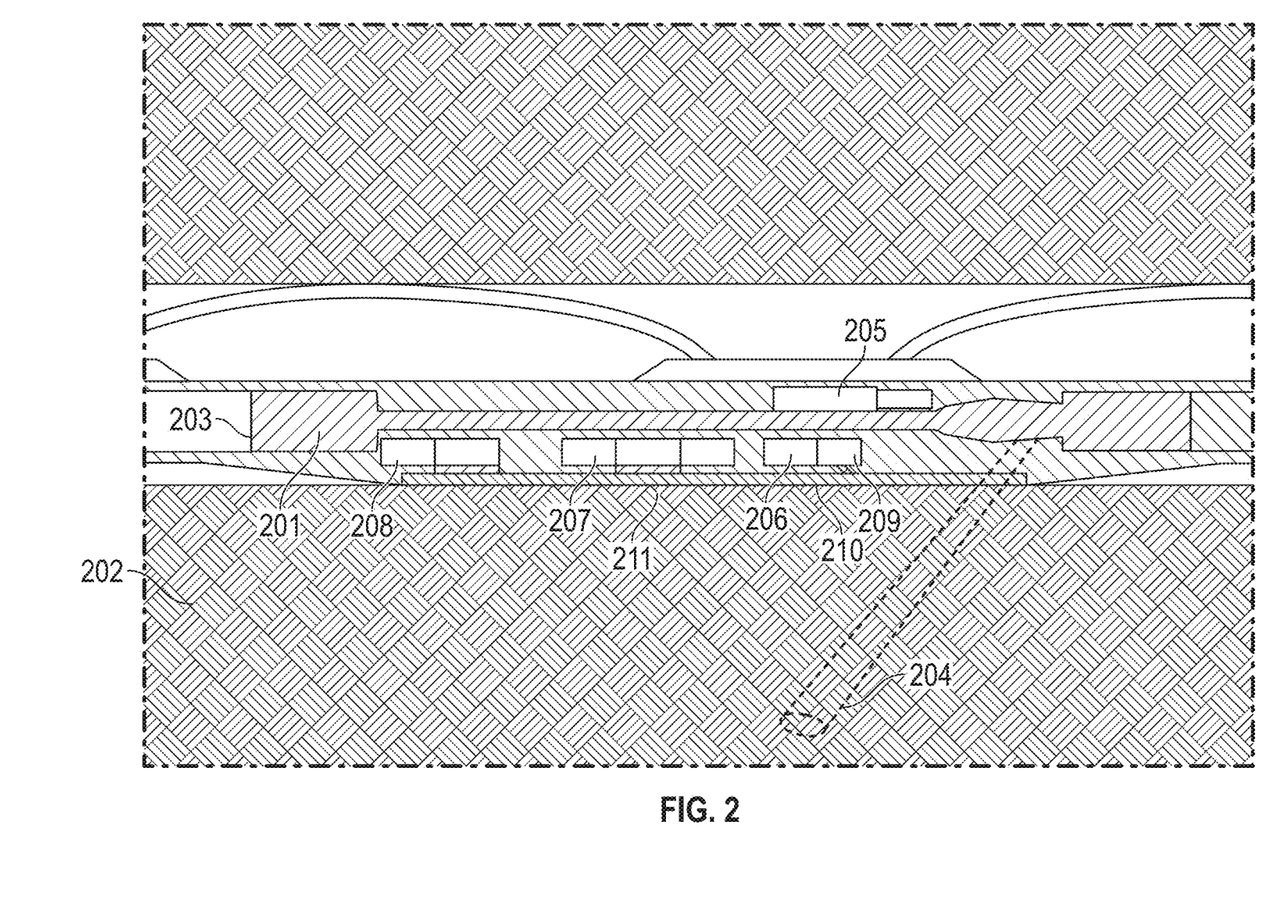
FIG. 2 is a layout view of a practical means of exercising the method within the confines of a borehole tool configured to measure formation density, non-invaded bulk density and borehole corrections using an x-ray tube as a radiation source.

FIG. 2 is a layout view of a practical means of exercising the method within the confines of a borehole tool [201] configured to measure formation density, non-invaded bulk density and borehole corrections using an x-ray tube [203] as a radiation [204] source. The x-ray source [203] produces a beam of x-rays [204] that illuminates the formation [202]. The x-ray source output is monitored by a reference detector [205], No direct beam path through the shielding [209] that surrounds the source [203] and detectors [205, 206, 207, 208] is necessary as the reference detector uses the shielding [209] to attenuate the radiation emanating directly from the source [204]. Note that the bulk density detector [207] is double-ended, such that the scintillator crystal is effectively comprised of two crystals back-to-back in the space of a single crystal (photomultiplier on each end). This arrangement effectively doubles the number of counts per second that can be collected prior to saturation while maintaining the detector volume.

Figure 3:
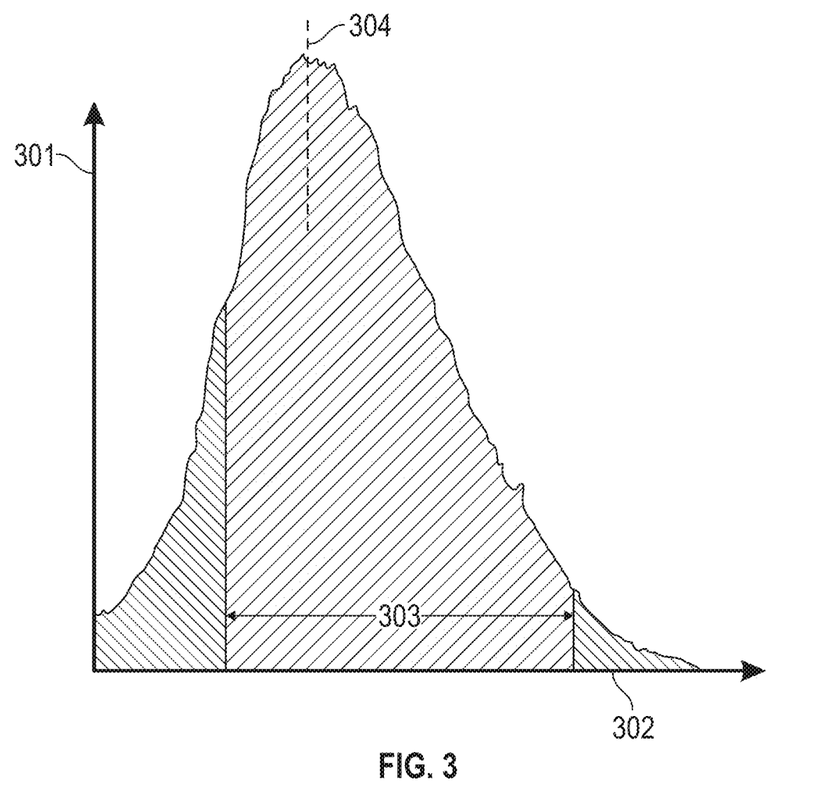
FIG. 3 illustrates a typical reference detector spectrum for a Compton range source, showing Intensity in the y-axis versus photon energy in the x-axis, wherein the windowed region of interest (the region between two specified energies) remains unchanged as the spectrum peak intensity moves.

FIG. 3 illustrates a typical reference detector spectrum for a Compton range source, showing intensity in the y-axis [301] versus photon energy in the x-axis [302], the windowed region of interest [303] (the region between two specified energies) remains unchanged as the spectrum peak intensity [304] moves.

Figure 4:
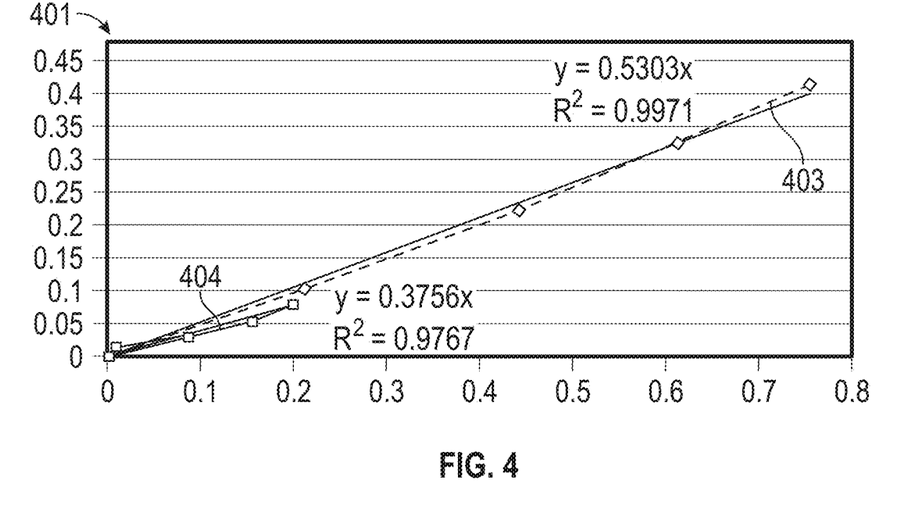
FIG. 4 illustrates a typical x-ray based plot of Density (DRho) vs RhoLS-RhoLS, noting the slope of Aluminum [403] versus Magnesium [404] responses, consistent with those typically by associated with a $^{137}Cs$ based litho-density tool.

FIG. 4 illustrates a typical x-ray based plot of Density (DRho) [401] vs RhoLS-RhoSS [402], note the slope of Aluminum [403] versus Magnesium [404] responses, being consummate with those typically by associated with a $^{137}$Cs based litho-density tool.

Figure 5:
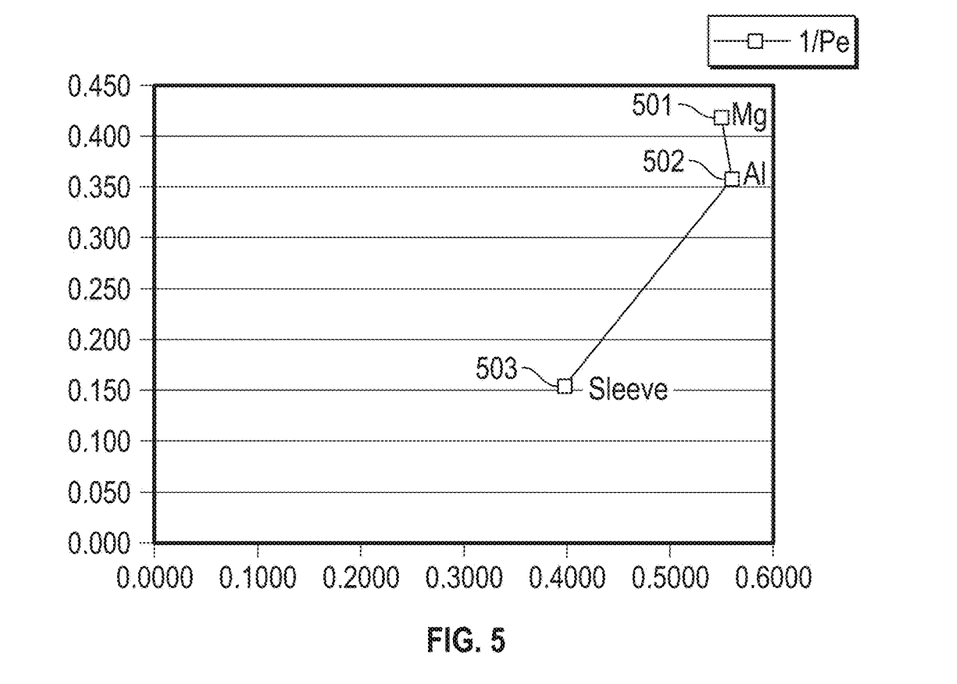
FIG. 5 illustrates a typical x-ray based plot of PE response, indicating a "Short Space" detector capable of predictable behavior when considering the photoelectric response of Magnesium, aluminum, and a Sleeve of known PE (in this case stainless steel).

FIG. 5 illustrates a typical x-ray based plot of PE response, indicating that the short space detector is capable of predictable behavior when considering the photoelectric response of Magnesium [501], aluminum [502] and a Sleeve of known PE (in this case stainless steel) [503]. See FIG. 7 for further clarification of PE ratios.

Figure 6:
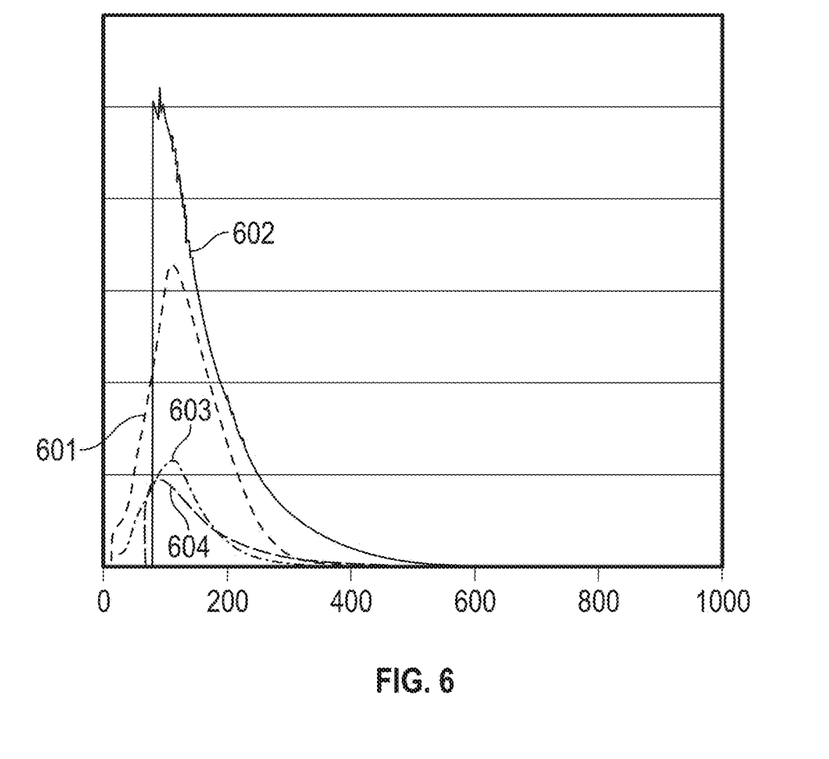
FIG. 6 illustrates a comparison of the spectral form of detected energies at the bulk density detector when measuring an aluminum formation versus a magnesium formation, when using $^{137}Cs$ and X-rays.

FIG. 6 illustrates a comparison of the spectral form of detected energies at the bulk density detector when measuring an aluminum formation versus a magnesium formation, when using $^{137}$Cs and X-ray. The x-ray equivalent [603] in aluminum of a $^{137}$Cs measurement [604] is of a very similar form. Equally, the x-ray equivalent [601] in, magnesium of a $^{137}$Cs measurement [602] is also of a very similar form. The formation tends to filter/scatter the higher energy of the $^{137}$Cs to such a degree that the form of the spectrum is practically indistinguishable from X-ray. As such the x-ray measurement physics result is interchangeable with that of a standard $^{137}$Cs-based litho-density tool.

Figure 7:
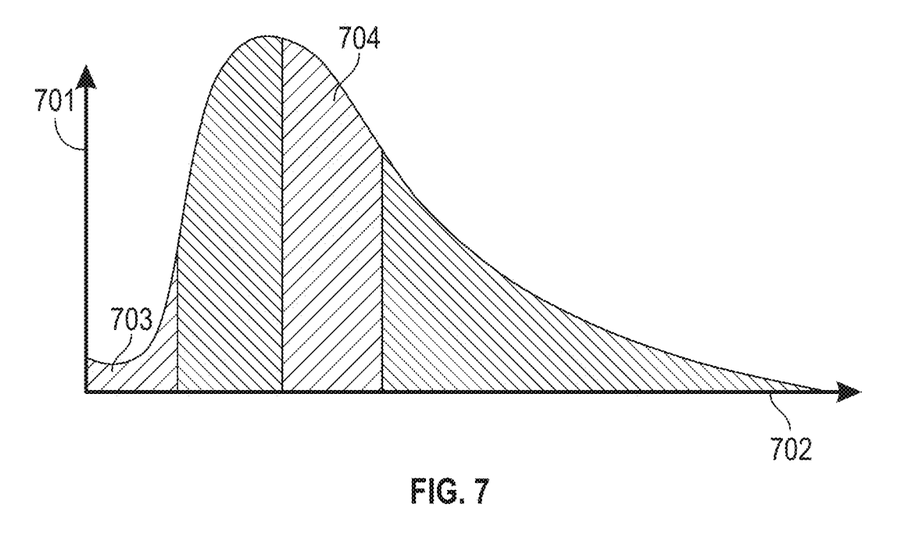
FIG. 7 illustrates a spectral representation of the short space detector showing intensity versus photon energy; the short space detector can be used to collect a spectrum of incoming photons, or to collect based upon energy thresholds, wherein specific energy windows are used to separate between counts originating from Compton scattering events, and those originating from photoelectric.

FIG. 7 is a spectral representation of the short-space detector showing intensity [701] versus photon energy [702]. The short space detector can be used to collect a spectrum of incoming photons, or to collect based upon energy thresholds, wherein specific energy windows are used to separate between counts originating from Compton scattering events, and those originating from photoelectric. In this respect, photoelectric energies would be represented by the counts within Window 1 [703], and Compton within Window 2 [704]. The ratio of the counts collected within Window 1 to Window 2 gives the basis of the photoelectric measurement.

Figure 8:
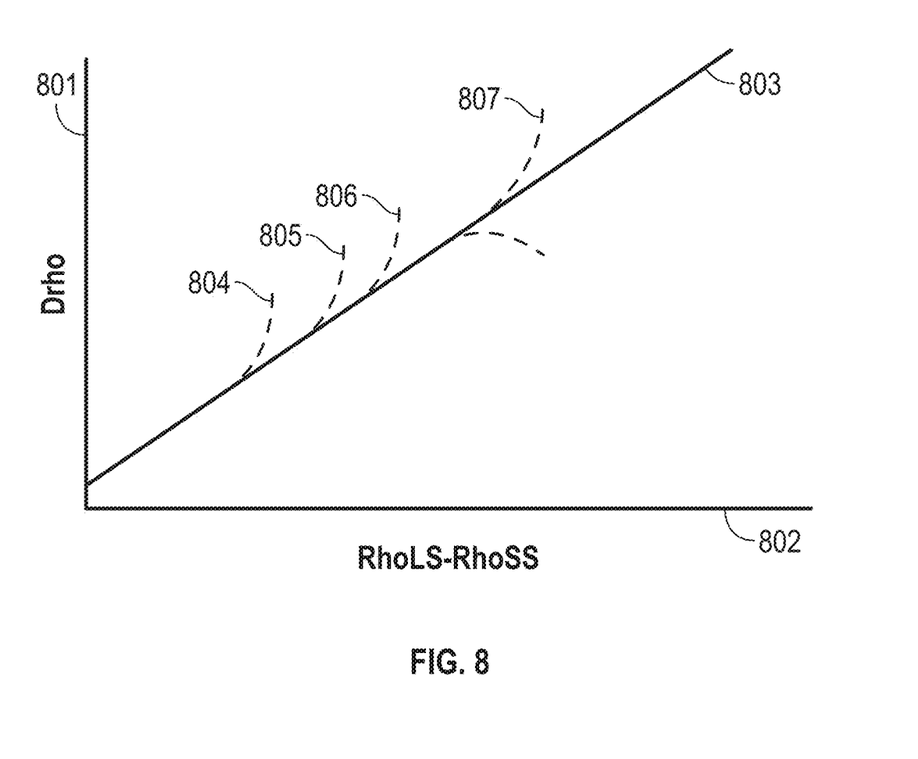
FIG. 8 illustrates the Aluminum-Magnesium slope on a DRho vs RhoLS-RhoSS plot exhibits 'ribs' that are the result of calibrating against mud-cake mats of varying mud-weights.

FIG. 8 illustrates the Aluminum-Magnesium slope [803] on a DRho [801] vs RhoLS-RhoSS [802] plot exhibits ribs [804, 805, 806, 807] that are the result of calibrating against mud-cake mats of varying mud-weights. Each curve [804, 805, 806, 807] is comprised of points that represent carrying thicknesses of mud-cake. In a typical Cs-based litho-density log, the mud-weight needs to be known to understand which rib the tool response is operating on.

In one example embodiment, the x-ray based litho-density formation evaluation tool [101] is deployed by wireline conveyance [102,103] into a borehole [104], wherein the formation [105] density is measured by the tool [101]. The tool [101] is enclosed by a pressure housing [201] which ensures that well fluids are maintained outside of the housing. The tool [101] is configured to measure formation density, non-invaded bulk density and borehole corrections using an x-ray tube [203] as a radiation [204] source.

The x-ray source [203] produces a beam of x-rays [204] that illuminates the formation [202]. The x-ray source output is monitored by a reference detector [205]. No direct beam path through the shielding [209] that surrounds the source [203] and detectors [205, 206, 207, 208] is necessary as the reference detector uses the shielding [209] to attenuate the radiation emanating directly from the source [204]. Note that the bulk density detector [207] is double-ended, such that the scintillator crystal is effectively comprised of two crystals back-to-back in the space of a single crystal (photomultiplier on each end). This arrangement effectively doubles the number of counts per second that can be collected prior to saturation of the crystal while maintaining the detector volume.

In a further embodiment, the detector crystal may be made from a direct conversion type, which converts the incoming x-ray photons directly into cascading electrons, to be read by an electronic read-out, device, rather than the x-rays being converted/scintillated to visible light within the crystal, which then must be converted to an electronic pulse via use of a photomultiplier tube.

In a still further embodiment, the crystal volume may be replaced entirely by an arrayed imaging detector, such as a Cadmium Telluride or Cadmium Zinc Telluride detector that is bonded to a two dimensional array of read-out circuits within an Application Specific Integrated Circuit (ASIC).

In a further embodiment still, at least two detectors [206, 207, 208] made of a scintillator crystal with an embedded micro-isotope check source (to be used in detector gain stabilization), are located axially offset from an x-ray tube [204] within a pressure housing [201]. The pressure housing [201] is maintained against the wall of a borehole by means of a wear-pad [210]. The tool is conveyed by means of a wireline or other conveyance device, along the axis of the well, typically filled with drilling fluids, such as mud. As a result of the drilling activity that created the well, mud (or drilling fluids) penetrate into the formation [202] a short distance leaving a mud-cake where the particulates within the mud get filtered out of the drilling fluid that permeates the formation.

In yet another embodiment, the detector [206] closest to the output beam exit (of the x-ray source) is primarily used to measure the standoff between the tool and the formation, due to borehole rugosity, and therefore, how much well fluid is between the tool and the formation (detector known as the short space). This is important as the amount of source radiation leaking down the annular space [211] between the tool and the formation gives rise to an increase in the number of photons entering the detectors [206, 207, 208] that have not been through the formation [202] (also known as borehole effect). In addition, the detector [206] can be used to measure photo-electric effects and give an indication of the type of materials forming the formation make-up. The short space detector can be used to collect a spectrum of incoming photons, or to collect based upon energy thresholds, wherein specific energy windows are used to separate between counts originating from Compton scattering events, and those originating from photoelectric.

In this respect, photoelectric energies would be represented by the counts within Window 1 [703], and Compton within Window 2 [704]. The ratio of the counts collected within Window 1 to Window 2 gives the basis of the photoelectric measurement. This is achieved through comparing two energy windows within the collected energy spectrum of the detector, one set at a lower energy (such as 80-100 keV) and another set at Compton energy ranges (such as 110-600 kev). Comparison of the ratio of the counts collected in each energy window permits an index of photoelectric effect, which may be characterized based upon the types of materials anticipated in the formation. The photoelectric index can be presented as a measurement versus depth of log.

In another embodiment, the next detector [207] further offset (known as the bulk density detector or long space) from the output beam [204] exit is used to measure formation [202] density. The output of this detector is compensated for borehole effect by measuring the known response of said detector to the characteristics of the short space detector. This detector is used to measure bulk density, which can be computed form the effective electron density of the formation. This is calculated from the known output of the x-ray source [204]. The higher the density of the formation [202], the fewer the number of counts enter the long space; conversely, the lower the formation density, the higher the number of counts. As the number of counts that can enter the bulk density detector [207] is so large compared to that of a typical $^{137}$Cs-based tool, either a scintillator with a lower conversion and restoration time needs to be selected (such as LaBr), or higher market availability scintillators, such as NO, can be used with an innovation. In a further embodiment, the bulk density detector [207] is double-ended, such that the scintillator crystal is effectively comprised of two crystals back-to-back in the space of a single crystal (photomultiplier on each end). This arrangement effectively doubles the number of counts per second that can be collected prior to the saturation of the crystal while maintaining the detector volume within a specific region of source [204] to detector [207] axial offset.

Due to the large output of the x-ray device, there are sufficient photons to ensure that a large number of photons can be detected at a significantly larger offset than typical $^{137}$Cs tools. For example, around 1,500 counts per second are required to be collected in the bulk density detector [207] in the region 180 keV to 510 keV to be able to compute a density with an uncertainty of 0.01 g/cc at a logging speed of 1,800 ft/hr. With an x-ray tube that is configured at a voltage sufficient to produce Compton scattering in the formation (i.e. >200 keV), then >1.500 counts per second of detected photons in bulk density detector [207] can be achieved at much higher logging speeds. An alternative use of the greater statistics is to adopt an additional detector at a much larger offset than typical long space detectors, and still have sufficient statistics (even with the larger offset) to achieve 0.01 g/cc. Typically, the number of counts at a certain position falls off exponentially with the axial offset distance from the source [204] beam exit.

One benefit of placing an additional detector at a much larger axial offset is that its depth of investigation is larger than a typical long space detector. Such a detector would be capable of measuring litho-density within the non-invaded zone of the formation, such that the effect of mud cake could be eliminated.

In a further embodiment, an additional detector [208] further offset (known as the non-invaded bulk density detector or ultra-long space) from the output beam [204] exit is used to measure formation [202] density. The output of this detector is compensated for borehole effect by measuring the known response of said detector to the characteristics of the short space detector [206]. The non-invaded bulk density detector [208] is used to measure the bulk density of the non-invaded portion of the formation [202] that has not been directly affected by drilling fluid invasion, hence can be computed from the effective electron density of the formation. In a further embodiment, the output of this detector is compensated for borehole effect by measuring the known response of said detector to the characteristics of the short space detector [206] and by that of the bulk density detector [207].

In a further embodiment, the Aluminum-Magnesium slope [803] on a DRho [801] vs RhoLS-RhoSS [802] plot exhibits ribs [804, 805, 806, 807] that are the result of calibrating against mud-cake mats of varying mud-weights. Each curve [804, 805, 806, 807] is comprised of points that represent carrying thicknesses of mud-cake. In a typical Cs-based litho-density log, the mud-weight needs to be known to understand which rib the tool response is operating on. Consequently, in the standard spine-rib algorithm all the ribs for the different mud-weights are collapsed onto a single rib. In addition, mud-mat/standoff thicknesses greater than 0.75" typically result in a curvature that detaches from the single rib, making it difficult to determine which rib is relevant for the log. However, by modulating the output energy of the x-ray source [204], it would be possible to determine the mud-cake type which would mean that the specific rib for that mud-weight could be used (rather than a generic rib), allowing any offset corrections/compensation greater than 0.75" to function correctly.

In a further embodiment still, the tool [101] is located within a logging-while-drilling (LWD) string, rather than conveyed by wireline. In a further embodiment, the LWD provisioned tool [101] would be powered by mud turbines.

In yet another embodiment, the tool [101] is combinable with other measurement tools such as neutron-porosity, natural gamma and/or array induction tools.

Providing a log showing the compensated long space computed density in addition to the compensated non-invaded ultra-long space computed density gives operators the ability to determine the veracity of their computed density and eliminate any concerns regarding the effect of mud invasion into the formation zone being measured.

Additionally, the higher intensity of the x-ray source can be used to perform very high speed (7,200 ft/hr) logging runs without sacrificing the statistics necessary to produce no more than 0.01 g/cc uncertainty within the measurement. As such, this would lead to the ability to perform the measurement at 4 times the speed of existing techniques and reduce the amount of rig time used to a quarter of that required for a typical $^{137}$Cs-based logging run.

Furthermore, the removal of the need for the dangerous radioactive isotope $^{137}$Cs with an x-ray source, which is harmless when de-energized, will revolutionize the simplicity and safety of the logistics and handling of logging equipment worldwide.

The foregoing specification is provided only for illustrative purposes, and is not intended to describe all possible aspects of the present invention. While the invention has herein been shown and described in detail with respect to several exemplary embodiments, those of ordinary skill in the art will appreciate that minor changes to the description, and various other modifications, omissions and additions may also be made without departing from the spirit or scope thereof.

The invention claimed is:

1. An x-ray based litho-density tool comprising:
an output exit;
an x-ray source that is offset from the output exit in an axial direction, the x-ray source to generate radiant energy that illuminates a formation surrounding a borehole via the output exit;
a source monitoring detector that is offset from the output exit in the axial direction and positioned between the x-ray source and the output exit; and
a radiation detector to generate data indicative of a density of the formation using the radiant energy, the radiation detector offset from the output exit in the axial direction and positioned between the x-ray source and the source monitoring detector.

2. The tool of claim 1, further comprising a short-space detector that is offset from the output exit in the axial direction and positioned between the radiation detector and the output exit, the short-space detector is to measure borehole standoff such that other detector responses are compensated for tool standoff.

3. The tool of claim 2, wherein the short-space detector is configured to distribute incoming photons into energy classifications, thereby admitting to photoelectric measurement.

4. The tool of claim 1, further a collimated radiation shield surrounding the x-ray source, the source monitoring detector, and the radiation detector.

5. The tool of claim 4, wherein the collimated radiation shield further comprises tungsten.

6. The tool of claim 4, wherein the reference detector attenuates the radiant energy emanating directly from the x-ray source using the collimated radiation shield.

7. The tool of claim 1, wherein the source monitoring detector is to monitor an output of the x-ray source.

8. The tool of claim 1, further comprising an additional radiation detector that is offset from the output exit in the axial direction and positioned between the radiation detector and the output exit, the additional radiation detector to measure litho-density of the formation at a first depth of investigation, and the radiation detector to measure litho-density of the formation at a second depth of investigation that is greater than the first depth of investigation.

9. The tool of claim 1, wherein the radiation detector includes a scintillator crystal and is double-ended such that the scintillator crystal is effectively comprised of two crystals back-to-back with a photomultiplier on each end.

10. The tool of claim 1, wherein the tool is configured to directly measure photoelectric properties of the formation using the x-ray source.

11. The tool of claim 1, further comprising a plurality of radiation detectors that includes the radiation detector, the plurality of radiation detectors located axially offset from the x-ray source within a pressure housing.

12. The tool of claim 11, wherein the plurality of radiation detectors is to directly measure both invaded bulk densities and non-invaded bulk densities of the formation.

13. An x-ray based litho-density tool comprising:
an output exit;
an x-ray source that is offset from the output exit in an axial direction, the x-ray source to generate radiant energy that illuminates a formation surrounding a borehole via the output exit;
a radiation detector to generate litho-density data indicative of a density of the formation using the radiant energy, the radiation detector offset from the output exit in the axial direction and positioned between the x-ray source and the output exit; and
a short-space detector to measure borehole standoff such that other detector responses are compensated for tool standoff, the short-space detector offset from the output exit in the axial direction and positioned between the radiation detector and the output exit.

14. The tool of claim 13, further comprising a non-invaded bulk density detector that is offset from the output exit in the axial direction and positioned between the x-ray source and the radiation detector.

15. The tool of claim 14, wherein the tool is operable to reduce mud-weight dependency-related uncertainty in the litho-density data using the non-invaded bulk density detector.

* * * * *